Figure 1:
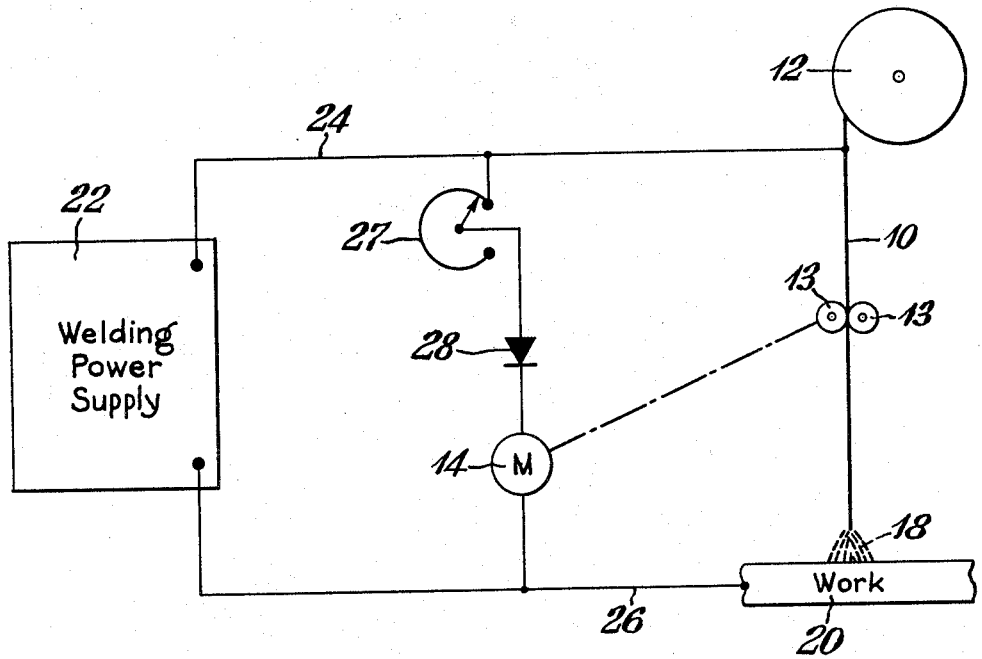

INVENTOR.
THOMAS A. HEENEY, JR.
BY
Barnwell P. King
ATTORNEY

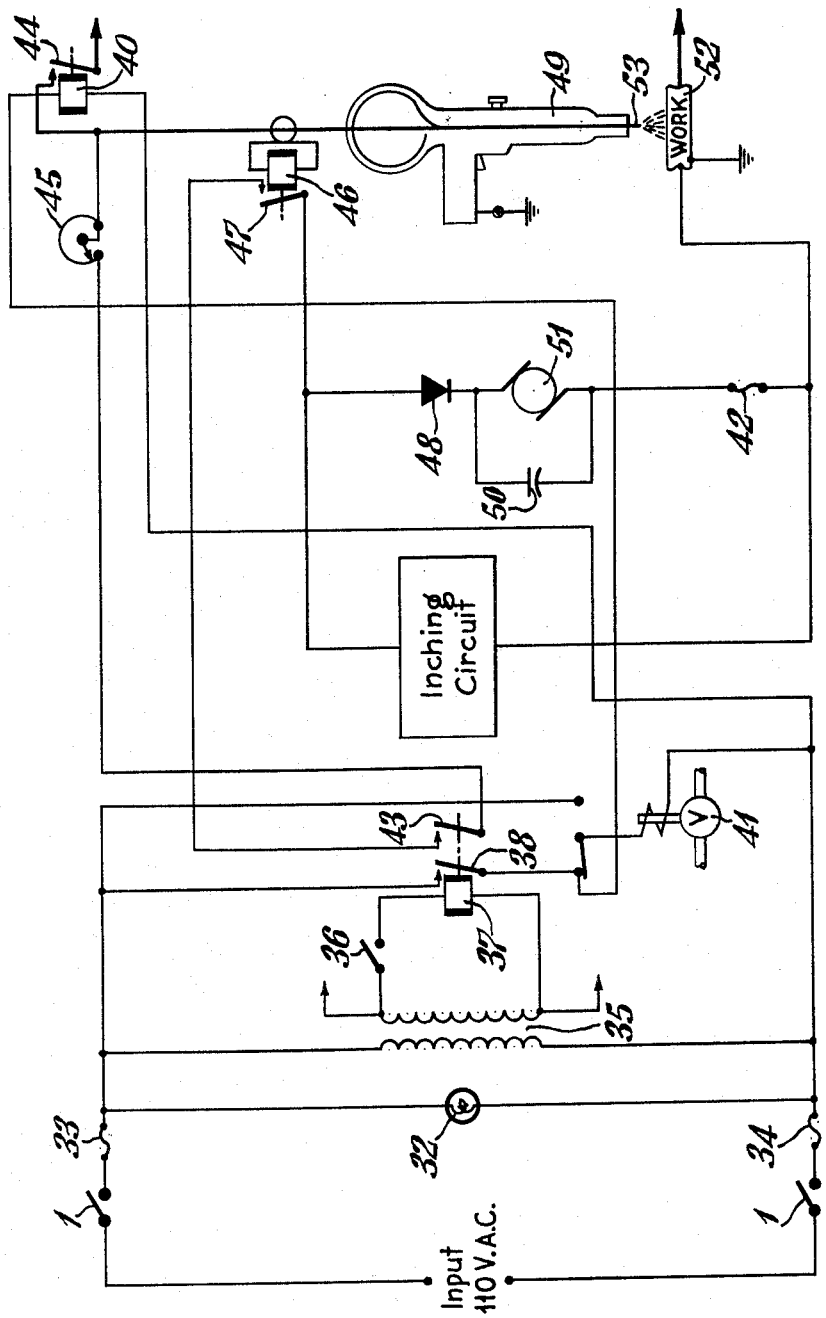

United States Patent Office 3,109,121
Patented Oct. 29, 1963

3,109,121
ARC WELDING CONTROL SYSTEM
Thomas A. Heeney, Jr., Summit, N.J., assignor to Union Carbide Corporation, a corporation of New York
Filed Sept. 15, 1961, Ser. No. 138,390
2 Claims. (Cl. 314—71)

This invention relates to consumable electrode work-in-circuit metal arc welding, and more particularly to an arc voltage control system for continuously short-circuiting type short arc welding in a protective atmosphere of selected gas.

For conventional mechanized metal arc welding some form of motor drive is required to feed the welding electrode into the arc at a desired rate. In many welding applications, the arc voltage is used for controlling the wire feed rate. The voltage across the arc is a function of the arc length; that is, the longer the arc length, the greater the arc voltage.

In some welding systems, the wire feed motor is connected directly across the arc through a control means, such as a rheostat. Thus, any tendency for the arc to lengthen will increase the arc voltage and, as a result, the voltage across the motor is also increased. Such an arrangement tends to maintain the arc at a constant length. Similarly, any tendency for the arc length to become shorter will reduce the wire feed speed and tend to maintain the arc length constant. The rheostat thus provides convenient means for selecting a desired arc length. When a longer arc length is desired, the value of the rheostat is increased, hence slowing the wire motor down, thereby increasing the arc length. In like manner, the reverse operation produces a shorter arc length.

The system as described above, is a self-compensating one and tends to maintain a constant arc length and has proven itself satisfactory for conventional non-short-circuiting metal arc welding. The arc length in such welding is relatively long and the arc voltage tends to remain fairly steady.

However, with the advent of continuously short-circuiting type metal transfer welding process which makes use of a relatively short arc, widely fluctuating arc voltages occur. This is attributed to the shorting characteristic of the arc. A conventional motor across such arc does not work very well with such process because the motor attempts to follow these fluctuations and thus produces erratic wire feed. Especially in the case of smaller motors, the inertia becomes less and there is a greater tendency on the part of the motor to follow each fluctuation. The problem is further aggravated when the motor used is of the shunt, separately excited, or permanent magnet type, because as soon as the arc voltage becomes lower than the motor counter E.M.F. voltage, dynamic braking is automatically applied to the motor (the degree of dynamic braking being proportional to the difference between the actual arc voltage and the motor counter E.M.F. voltage). Thus, where a small, low inertial shunt motor is used as the wire feed means for welding processes using short-circuiting type metal transfer having short arc lengths, the motor tends closely to follow the fluctuating arc voltage, resulting in a distinct pumping action in the rate of wire feed.

The main object of this invention is to provide a wire feed motor speed control system in which the motor responds to arc voltage fluctuations of appreciable duration without responding to arc voltage outages continuously occurring at the short-circuit intervals during the metal transfer process.

Another object is to increase the life of the wire feed motor by preventing intermittent occurrences of dynamic braking across such motor.

The invention provides an arc welding control system for work-in-circuit consumable electrode metal arc welding in a protective gaseous atmosphere in which a direct current continuously short-circuiting type short arc is energized between the end of a wire constituting such electrode and the work being welded. The system comprises a relatively small wire feed shunt motor having a permanent type magnetic field and an armature, the inertia of which is relatively low, and a shunt circuit connecting said armature across such an arc through a rheostat and a rectifier in series with such armature so that such circuit is responsive to the full arc voltage. The current carrying direction of said rectifier is such that the low inertia armature of said wire feed motor responds to full arc voltage fluctuations of appreciable duration without responding to arc voltage outages occurring at the continuously short-circuiting intervals during the metal transfer process between the end of such wire and the work, thereby maintaining an arc voltage and arc length corresponding to the setting of said rheostat even in the case of such small-low inertial motor.

In a refinement of the invention a condenser is provided in shunt with the armature for the purpose of supplying power only to the armature during such arc voltage outages by connecting the condenser and rectifier in series to exclude any energy stored in the condenser from being applied between the wire and work.

Figure 2:
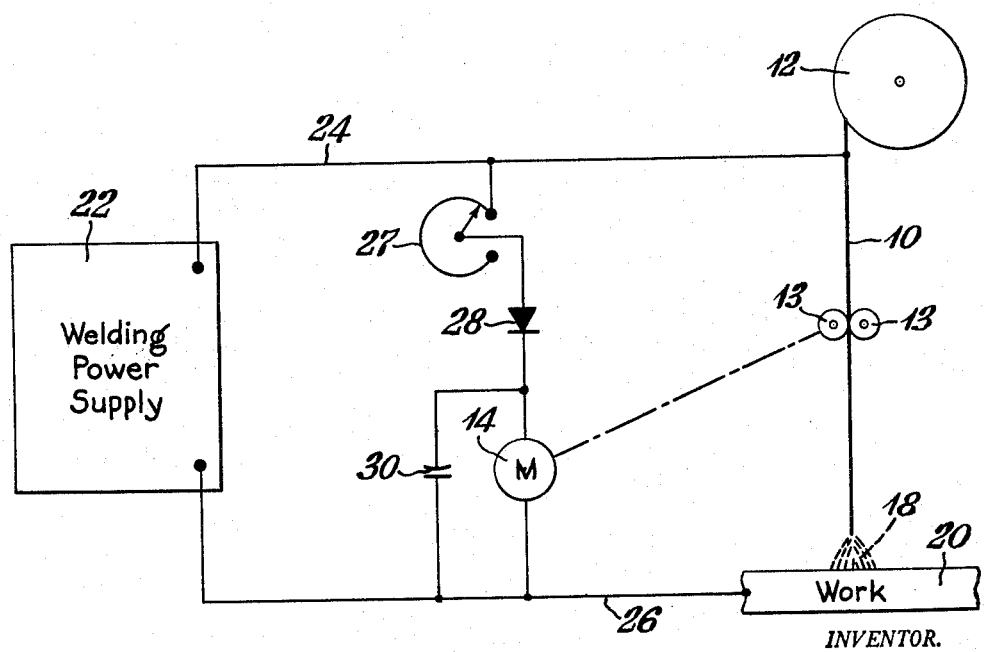

In the drawings:
FIG. 1 is a simplified circuit diagram of the invention;
FIG. 2 is a simplified circuit diagram of a modification of the invention;
FIG. 3 is a more complete circuit diagram of such modification.

As shown in FIG. 1, welding electrode wire 10 is drawn from a reel 12 by feed rolls 13, driven by a shunt motor 14, and fed toward welding arc 18 between the end of such wire and the work 20 being welded. Such arc is energized by direct current electric welding power supply 22 connected across the wire and work by leads 24 and 26, and across the motor 14 through a rheostat 27 and a rectifier 28 in series circuit relation with one another.

With such circuit, as long as the welding arc voltage is greater than the motor counter E.M.F., power will be fed to the motor armature through rectifier 28. However, if the arc voltage drops below the motor counter E.M.F. voltage, dynamic braking is not applied to the motor 14 as with former systems, because rectifier 28 prevents current from flowing in the direction required to apply dynamic braking. Thus, the motor will not immediately slow down each time a metal droplet is transferred by short-circuiting from the wire 10 to the work 18.

As shown in FIG. 2, a condenser 30 is connected across the motor 14 to act as a filter which serves to store voltage peaks when the arc voltage is at a value greater than that of the motor counter E.M.F. Such condenser serves to deliver power to the motor 14 during the period when the arc voltage is below the motor counter E.M.F. voltage, and the rectifier is not conducting current.

Thus, the combination of the rectifier 28 and the condenser 30 both tend to maintain the motor voltage at a relatively even value despite rapid changes in arc voltage caused by the continuously short-circuit type metal transfer. However, the circuit accurately responds to arc voltage changes which persist for any appreciable time and therefore good arc voltage control and smooth wire feed are provided, even under the adverse conditions met with under a short-circuiting type of arc. Thus, the invention makes possible the use of a small, low inertia wire feed motor which otherwise would adversely respond to the continuously short-circuiting type of arc.

When main line double pole-single throw switch 1, FIG. 3, is closed, 110 volts A.C. is applied across pilot light 32 and transformer 35 through fuses 33 and 34. After torch switch 36 is closed, the weld start relay 37 is energized and the normally open contacts 38 and 43 close. When normally open contact 38 of the weld start relay 37 closes, weld contactor 40 and gas solenoid valve 41 are activated. Simultaneously, the normally open contacts 44 of the weld contactor 40 close and apply welding power to the torch 49. As welding electrode 53 strikes workpiece 52, welding current begins to flow and weld current relay 46 is energized. As this occurs, normally open contact 47 of weld current relay 46 closes and applies welding voltage across rheostat 45, silicon rectifier 48, motor armature 51, condenser 50, and fuse 42. Next current begins to flow through rheostat 45, silicon rectifier 48, motor armature 51, fuse 52, and condenser 50 tends to charge to a value equal to that of the peak welding voltage. Now motor armature 51 feeds wire 53 at a speed proportional to the arc voltage.

At the instant welding electrode 53 contacts the workpiece 52, an arc outage of a short duration occurs. As the voltage across motor armature 51 and condenser 50 decreases, silicon rectifier 48 ceases to conduct, and thus prevents dynamic braking from being applied to motor 51. At that same instant, condenser 50 begins to discharge through motor armature 51, thus applying a small discharge current to said motor armature 51. Consequently, the wire feed rate is reasonably constant during the arc outage interval of the welding cycle.

When the arc voltage between welding electrode 53 and workpiece 52 becomes greater than the voltage across the motor armature 51 and condenser 50, the silicon rectifier 48 begins to conduct. This permits condenser 50 to recharge to a peak arc voltage value and said arc voltage is instantaneously applied across the motor armature 51. Upon the removal of welding electrode 53 from workpiece 52, the arcing interval of the welding cycle is reinstated, and the wire feed motor speed is controlled by the arc voltage fluctuations during such interval.

What is claimed is:

1. An arc welding control system for work-in-circuit consumable electrode metal arc welding in a selected gaseous atmosphere in which a direct current continuously short-circuiting type short arc is energized between the end of a wire constituting such electrode and the work being welded, such system comprising a relatively small wire feed shunt motor having a permanent magnetic type field and an armature which is relatively low, a shunt circuit connecting said armature across such arc through a rheostat and a rectifier in series with such armature, such circuit being responsive directly to the full arc voltage, the current conducting direction of said rectifier being such that said low inertia armature of said wire feed motor responds to full arc voltage fluctuations of appreciable duration without responding to arc voltage outages occurring at the continuously short-circuiting intervals during the metal transfer process between the end of such wire and the work, thereby maintaining an arc voltage and arc length corresponding to the setting of said rheostat.

2. An arc welding control system as defined by claim 1, in which a condenser is connected in shunt with the wire feed motor armature for the purpose of supplying power only to said armature during such arc voltage outages to further smooth the wire feed operation, said condenser and said rectifier being connected in series to exclude any energy stored in the condenser from being applied between the wire and the work.

References Cited in the file of this patent
UNITED STATES PATENTS 2,857,546 Lund _____ Oct. 21, 1958
3,021,420 Ruland et al. _____ Feb. 13, 1962